United States Patent
Kang et al.

(10) Patent No.: US 8,873,901 B2
(45) Date of Patent: Oct. 28, 2014

(54) BURIED-TYPE OPTICAL INPUT/OUTPUT DEVICES AND METHODS OF MANUFACTURING THE SAME

(75) Inventors: Pil-Kyu Kang, Anyang-si (KR); Dae-Lok Bae, Seoul (KR); Byung-Lyul Park, Seoul (KR); Gil-Heyun Choi, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 192 days.

(21) Appl. No.: 13/494,445

(22) Filed: Jun. 12, 2012

(65) Prior Publication Data
US 2012/0314993 A1   Dec. 13, 2012

(30) Foreign Application Priority Data
Jun. 13, 2011   (KR) .................. 10-2011-0056950

(51) Int. Cl.
*G02B 6/12* (2006.01)
*G02B 6/30* (2006.01)
*G02B 6/124* (2006.01)
*G02B 6/42* (2006.01)

(52) U.S. Cl.
CPC .......... *G02B 6/305* (2013.01); *G02B 2006/121* (2013.01); *G02B 6/124* (2013.01); *G02B 2006/12147* (2013.01); *G02B 6/4204* (2013.01); *G02B 2006/12107* (2013.01)

USPC ........................................... 385/14

(58) Field of Classification Search
None
See application file for complete search history.

(56) References Cited

U.S. PATENT DOCUMENTS

| | | | |
|---|---|---|---|
| 5,747,860 A * | 5/1998 | Sugiyama et al. | 257/432 |
| 6,498,873 B1 | 12/2002 | Chandrasekhar et al. | |
| 7,305,157 B2 | 12/2007 | Ahn et al. | |
| 2007/0080414 A1* | 4/2007 | Bjorkman et al. | 257/432 |
| 2007/0104410 A1* | 5/2007 | Ahn et al. | 385/14 |
| 2007/0104441 A1 | 5/2007 | Ahn et al. | |
| 2008/0105940 A1 | 5/2008 | Piede et al. | |
| 2011/0129231 A1* | 6/2011 | Fiorentino et al. | 398/141 |
| 2011/0170819 A1* | 7/2011 | Zheng et al. | 385/2 |
| 2012/0156369 A1* | 6/2012 | Kim et al. | 427/163.2 |
| 2013/0062719 A1* | 3/2013 | Kang et al. | 257/432 |
| 2013/0092980 A1* | 4/2013 | Na et al. | 257/184 |

FOREIGN PATENT DOCUMENTS

KR   10-2002-0018611 A   3/2002

* cited by examiner

*Primary Examiner* — Sung Pak
(74) *Attorney, Agent, or Firm* — Harness, Dickey & Pierce, P.L.C.

(57) ABSTRACT

Optical input/output (I/O) devices, which include a substrate including a trench, a waveguide within the trench of the substrate; and a photodetector within the trench and optically connected to the waveguide. An upper surface of the photodetector is at a same level as an upper surface of the waveguide.

20 Claims, 17 Drawing Sheets

BURIED-TYPE OPTICAL INPUT/OUTPUT DEVICES AND METHODS OF MANUFACTURING THE SAME

CROSS-REFERENCE TO RELATED APPLICATION

This application claims priority under 35 U.S.C. §119 to Korean Patent Application No. 10-2011-0056950 filed on Jun. 13, 2011, the disclosure of which is hereby incorporated herein by reference in its entirety.

BACKGROUND

1. Field

Example embodiments relate to optical input/output (I/O) devices including a waveguide, a coupler, and a photodetector, and methods of manufacturing the same.

2. Description of Related Art

An optical input/output (I/O) device is a device configured to transmit and receive data using light. The optical I/O device may include a coupler optically connected to optical fibers, a photodetector configured to convert an optical signal and an electric signal into each other, and a waveguide configured to optically connect the coupler and the photodetector.

A conventional method of manufacturing an optical input/output (I/O) device includes forming a trench in a substrate, which is generally a bulk silicon wafer, forming a waveguide in the trench, and forming a photodetector on a top surface of the waveguide. That is, in the conventional optical I/O device, the photodetector protrudes from a top surface of the wafer.

Thus, when memory cells (e.g., dynamic random access memory (DRAM) cells) are formed on the substrate, the photodetector may be damaged due to a process of forming the memory cells.

SUMMARY

Example embodiments relate to optical input/output (I/O) devices including a waveguide, a coupler, and a photodetector, and methods of manufacturing the same.

Example embodiments provide optical input/output (I/O) devices having improved reliability, and methods of manufacturing the same.

Other example embodiments provide a semiconductor device, a memory module, and an electronic system including the optical I/O devices.

Aspects of the example embodiments should not be limited by the following description, and other unmentioned aspects will be clearly understood by one of ordinary skill in the art from example embodiments described herein.

In accordance with example embodiments, an optical I/O device includes a substrate including a trench, a waveguide within the trench of the substrate, and a photodetector within the trench and optically connected to the waveguide. A top (or, upper) surface of the photodetector is at the same level as a top (or, upper) surface of the waveguide.

The waveguide may have the top (or, upper) surface, a first lateral surface, a second lateral surface, and an end surface. The photodetector may be in direct contact with the first lateral surface of the waveguide. The photodetector may be in direct contact with the second lateral surface of the waveguide.

A horizontal width of the photodetector may be greater than a horizontal width of the waveguide. A horizontal width of the trench may be greater than the sum of a horizontal width of the photodetector and a horizontal width of the waveguide.

The photodetector may have a thickness equal to that of the waveguide.

The waveguide may include silicon (Si), and the photodetector may include germanium (Ge).

The optical I/O device may further include a first clad insulating layer between a bottom (or, lower) surface of the trench and a bottom (or, lower) surface of the photodetector, and a second clad insulating layer between a lateral surface of the trench and a lateral surface of the photodetector.

The second clad insulating layer and the first clad insulating layer may include the same (or, identical) materials.

In accordance with example embodiments, an optical I/O device includes a substrate including a trench having a first side and a second side, a coupler at the first side of the trench of the substrate, a photodetector at the second side of the trench of the substrate, and a waveguide configured to provide an optical connection between the coupler and the photodetector. The coupler, the photodetector, and the waveguide are within the trench.

The photodetector may be in direct contact with a first lateral surface of an end portion of the waveguide. The photodetector may be in direct contact with the first lateral surface of the end portion, and an end surface of the end portion.

The photodetector may surround an end portion of the waveguide.

A top (or, upper) surface of the photodetector, a top (or, upper) surface of the coupler and a top (or, upper) surface of the waveguide may be at the same level.

The photodetector may include a first doping region, a second doping region, and an intrinsic region. The intrinsic region is between the first and second doping regions, and the second doping region may include impurities of a different conductivity type than the first doping region.

In accordance with example embodiments, an optical I/O device includes a waveguide within a substrate, and at least one photodetector optically connected to the waveguide. The at least one photodetector has a height equal to that of the waveguide.

An upper surface of the at least one photodetector and an upper surface of the waveguide may be on a same level.

The at least one photodetector may be along a sidewall of the waveguide.

The at least one photodetector may include a first doping region and a second doping region respectively along a same sidewall of the waveguide.

The at least one photodetector may include a first doping region and a second doping region respectively along opposing sidewalls of the waveguide.

BRIEF DESCRIPTION OF THE DRAWINGS

Example embodiments will be more clearly understood from the following detailed description taken in conjunction with the accompanying drawings. FIGS. 1-33 represent non-limiting, example embodiments as described herein.

FIG. 1 is a perspective view of an optical input/output (I/O) device according to example embodiments;

FIG. 3 is a plan view of a second region of an optical I/O device according to example embodiments;

FIG. 4 is a plan view of a second region of an optical I/O device according to example embodiments;

FIG. 5 is a plan view of a second region of an optical I/O device according to example embodiments;

FIGS. 6 through 26 are cross-sectional views illustrating a method of manufacturing the optical I/O device shown in FIGS. 1, 2A and 2B according to example embodiments;

FIGS. 27 through 30 are cross-sectional views illustrating a method of manufacturing the optical I/O device shown in FIGS. 1, 2A and 2B according to example embodiments;

FIG. 31 is a construction diagram of a semiconductor device including an optical I/O device according to example embodiments;

FIG. 32 is a construction diagram of a memory module including an optical I/O device according to example embodiments; and FIG. 33 is a construction diagram of an electronic system including an optical I/O device according to example embodiments.

DETAILED DESCRIPTION OF THE EMBODIMENTS

Figure 1:
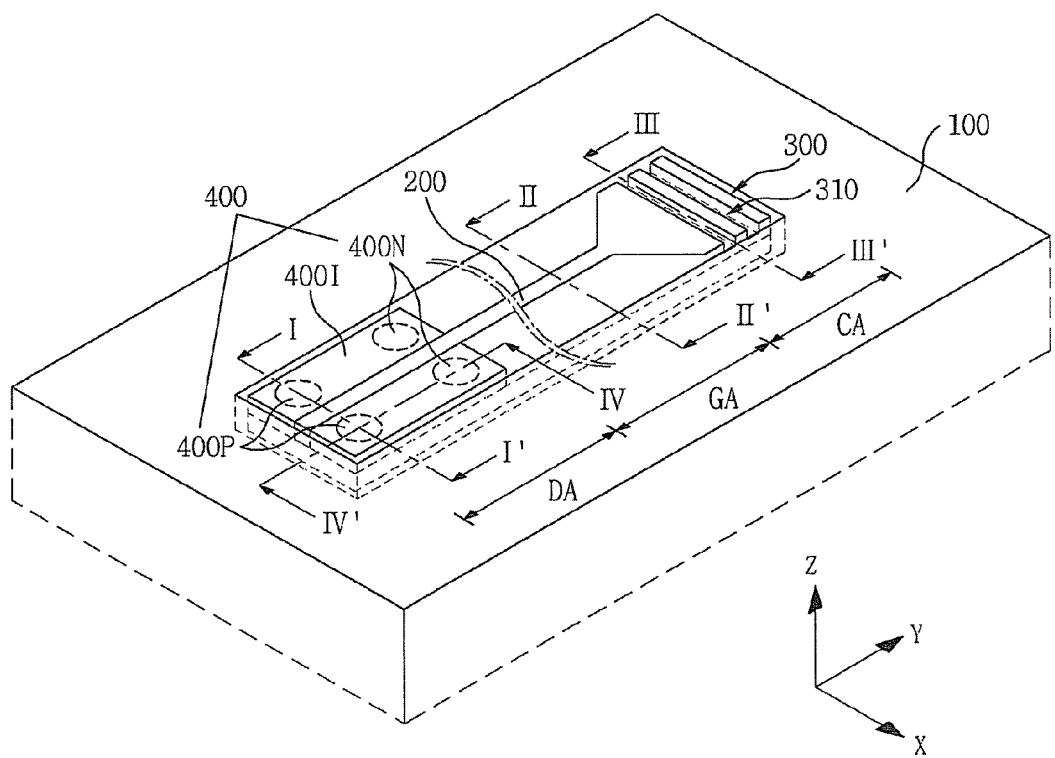

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the invention.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In order to more specifically describe example embodiments, various aspects will be described in detail with reference to the attached drawings. However, the present invention is not limited to example embodiments described.

Example embodiments relate to optical input/output (I/O) devices including a waveguide, a coupler, and a photodetector, and methods of manufacturing the same.

Figure 2A:
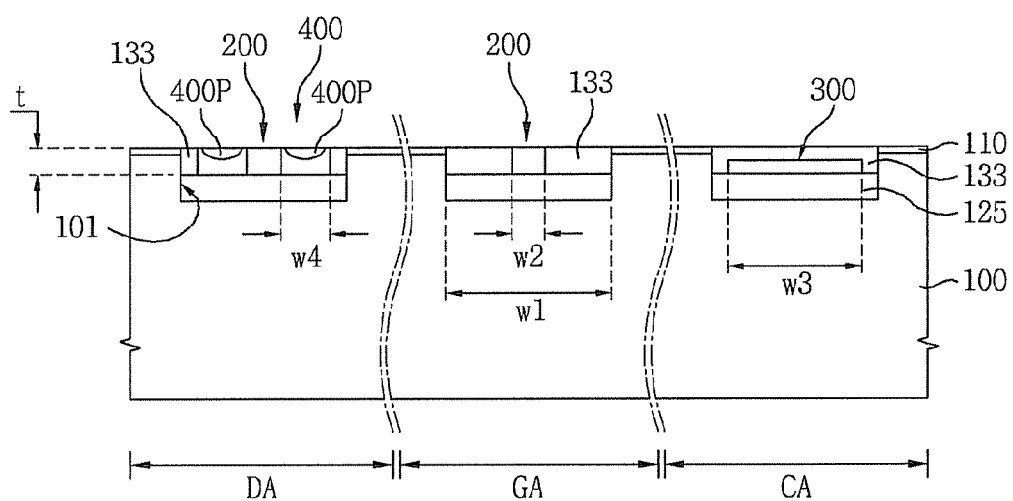
FIG. 2A is a cross-sectional view taken along lines I-I', II-II', and III-III' of FIG. 1.

FIG. 1 is a perspective view of an optical input/output (I/O) device according to example embodiments. FIG. 2A is a cross-sectional view taken along lines I-I', II-II', and III-III' of FIG. 1, and FIG. 2B is a cross-sectional view taken along line IV-IV' of FIG. 1.

Figure 2B:
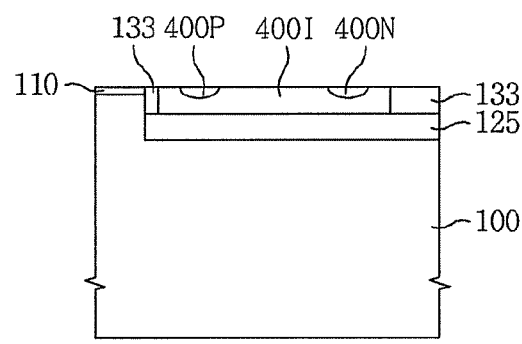
FIG. 2B is a cross-sectional view taken along line IV-IV' of FIG. 1.

Referring to FIGS. 1, 2A, and 2B, an optical I/O device may include a substrate 100 including a first region CA, a second region DA, and a third region GA, a coupler 300 disposed in the first region CA of the substrate 100, a photodetector 400 disposed in the second region DA of the substrate 100, and a waveguide 200 configured to optically connect between the coupler 300 and the photodetector 400.

The substrate 100 may be a bulk silicon wafer. The third region GA may be disposed between the first and second regions CA and DA. The substrate 100 may include a trench 101. The trench 101 may be formed across the first region CA, the second region DA, and the third region GA. The trench 101 may have a first horizontal width w1 in a first direction X. The trench 101 may extend in a second direction Y vertical to the first direction X.

A first insulating layer 110 may be disposed on a surface of the substrate 100. The first insulating layer 110 may include a material having a high etching selectivity with respect to the substrate 100. The first insulating layer 110 may be a silicon oxide ($SiO_2$) layer, a silicon nitride (SiN) layer, a silicon oxynitride (SiON) layer, or a stack structure thereof. The first insulating layer 110 may be penetrated by the trench 101. The trench 101 may extend through (or, be recessed within) the first insulating layer 110.

The waveguide 200 may optically connect the coupler 300 and the photodetector 400. The waveguide 200 may have a second horizontal width w2 less than the first horizontal width w1 in the first direction X. Thus, the waveguide 200 may be disposed within the trench 101. The waveguide 200 may have a set thickness t in a third direction Z vertical to a plane formed by the first direction X and second direction Y. The waveguide 200 may be disposed within the trench 101 of the second region DA and third region GA. That is, the waveguide 200 may run (or, extend) across the second region DA and third region GA. The waveguide 200 may include single crystalline silicon.

The coupler 300 may optically communicate data with an electronic device (e.g., memory cells) using optical fibers. For example, the coupler 300 may concentrate an optical signal received through the optical fibers and transmit the optical signal to the photodetector 400. The coupler 300 may include a grating 310 having concave and convex portions. The grating 310 may concentrate the optical signal transmitted from the optical fibers.

The coupler 300 may have a third horizontal width w3 less than the first horizontal width w1 in the first direction X. Thus, the coupler 300 may be disposed within the trench 101. The coupler 300 may include single crystalline silicon.

The photodetector 400 may convert an optical signal and an electric signal into each other. For example, the photodetector 400 may absorb the optical signal transmitted from the coupler 300 through the waveguide 200 and convert the optical signal into an electric signal. The photodetector 400 may include single crystalline germanium (Ge).

The photodetector 400 may have a fourth horizontal width w4 less than the first horizontal width w1 in the first direction X. The photodetector 400 may be disposed parallel to the waveguide 200. The photodetector 400 may be disposed on both lateral surfaces of the waveguide 200 of the second region DA. The sum of twice the fourth horizontal width w4 and the second horizontal width w2 may be less than the first horizontal width w1. That is, a lateral surface of the photodetector 400 may be spaced apart from a lateral surface of the trench 101 in the first direction X. Thus, the photodetector 400 may be disposed within the trench 101.

The photodetector 400 may be in direct contact with both lateral surfaces of the waveguide 200. A contact area between the photodetector 400 and the waveguide 200 may be proportional to photoelectric conversion efficiency of the photodetector 400. Thus, as compared with the conventional art, the optical I/O device according to the example embodiments may increase the contact area between the photodetector 400 and the waveguide 200, and improve the photoelectric conversion efficiency of the photodetector 400. The photodetector 400 may include crystals grown from the lateral surface of the waveguide 200. The photodetector 400 may have the same desired thickness t as the waveguide 200 in the third direction Z.

The photodetector 400 may include a first doping region 400P, a second doping region 400N, and an intrinsic region 400I. The first doping region 400P may be spaced apart from the second doping region 400N. The intrinsic region 400I may be interposed between the first and second doping regions 400P and 400N. The second doping region 400N may include impurities of a different conductivity type than the first doping region 400P. For example, the first doping region 400P may include P-type impurities, and the second doping region 400N may include N-type impurities.

The waveguide 200, the coupler 300, and the photodetector 400 may be disposed within the trench 101 of the substrate 100. A top (or, upper) surface of the photodetector 400 may be at the same level as a top (or, upper) surface of the waveguide 200. The top surface of the photodetector 400 may be at the same level as a top (or, upper) surface of the grating 310 of the coupler 300. The top surface of the waveguide 200, a top surface of the coupler 300, and the top surface of the photodetector 400 may be at the same level. The waveguide 200, the coupler 300, and the photodetector 400 may be completely buried within the trench 101 of the substrate 100.

The optical I/O device according to example embodiments may further include a first clad insulating layer 125 disposed between a bottom (or, lower) surface of the trench 101 and a bottom (or, lower) surface of the waveguide 200, a bottom (or, lower) surface of the coupler 300, and a bottom (or, lower) surface of the photodetector 400. Also, the optical I/O device according to example embodiments may further include a second clad insulating layer 133 surrounding a lateral (or, side) surface of the trench 101, a lateral (or, side) surface of the waveguide 200, a lateral (or, side) surface of the coupler 300, and a (or, side) lateral surface of the photodetector 400.

Specifically, the trench 101 may be partially buried by (or, in) the first clad insulating layer 125. A top (or, upper) surface of the first clad insulating layer 125 may be lower than a top surface of the first insulating layer 110. The waveguide 200, the coupler 300, and the photodetector 400 may be disposed on the first clad insulating layer 125. The second clad insulating layer 133 may be disposed on the first clad insulating layer 125. The second clad insulating layer 133 may have the same thickness as the waveguide 200, the coupler 300, and the photodetector 400. The top surface of the waveguide 200, the top surface of the coupler 300, and the top surface of the photodetector 400 may be at the same level as the top surface of the first insulating layer 110. Thus, the top surface of the second clad insulating layer 133 and the top surface of the waveguide 200, the coupler 300, and the photodetector 400 may be exposed to the same plane of the substrate 100.

The first clad insulating layer 125 may have an etching selectivity with respect to the first insulating layer 110. For example, the first insulating layer 110 may include a silicon nitride layer, and the first clad insulating layer may include a silicon oxide layer. The first clad insulating layer 125 may have a lower refractive index than the waveguide 200.

The second clad insulating layer 133 may have an etching selectivity with respect to the first insulating layer 110. The second clad insulating layer 133 may include the same material as the first clad insulating layer 125. For example, the first clad insulating layer 125 and second clad insulating layer 133 may include the same oxide layer. The second clad insulating layer 133 may partially cover the top surface of the coupler 300. For instance, the second clad insulating layer 133 may be in contact with a lateral (or, side) surface of the grating 310 of the coupler 300.

As a consequence, the optical I/O device according to example embodiments may include the waveguide 200, the coupler 300, and the photodetector 400 buried in the trench 101 of the substrate 100. Thus, the optical I/O device according to example embodiments may prevent the waveguide 200, the coupler 300, and the photodetector 400 from being damaged due to a subsequent process of manufacturing an electronic device (e.g., a memory cell) to be formed on the substrate 100.

Figure 3:
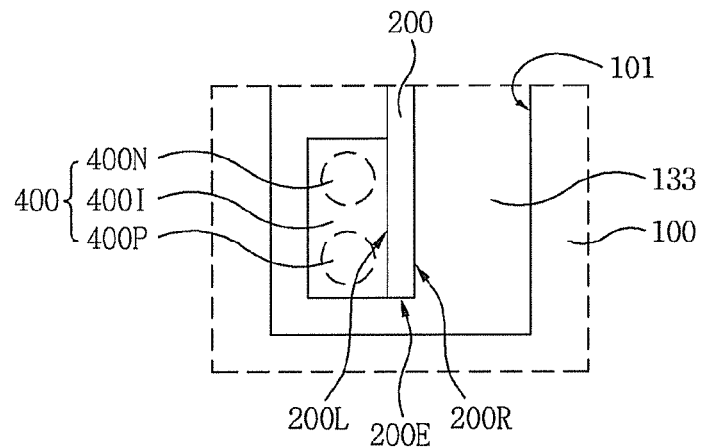

FIG. 3 is a plan view of a second region of an optical I/O device according to example embodiments.

Hereinafter, differences between the optical I/O device according to FIG. 1 and the optical I/O device shown in FIG. 3 will be described with reference to FIG. 3. Thus, a detailed description of the same, or similar, components as in the optical I/O device shown in FIG. 1 will be omitted.

Referring to FIG. 3, in an optical I/O device according to example embodiments, a photodetector 400 may be in direct contact with a left lateral (or, side) surface 200L of a waveguide 200. That is, the photodetector 400 may be in direct contact with the left lateral surface 200L of one end portion of the waveguide 200. Thus, the second clad insulating layer 133 may be disposed between the photodetector 400 and a trench 101, between an end surface 200E of the waveguide 200 and an end surface of the trench 101, and between a right lateral surface 200R of the waveguide 200 and the trench 101. That is, the second clad insulating layer 133 may be in contact with the end surface 200E, a right lateral surface 200R of the waveguide 200, and a portion of the left lateral surface 200L of the waveguide 200.

Figure 4:
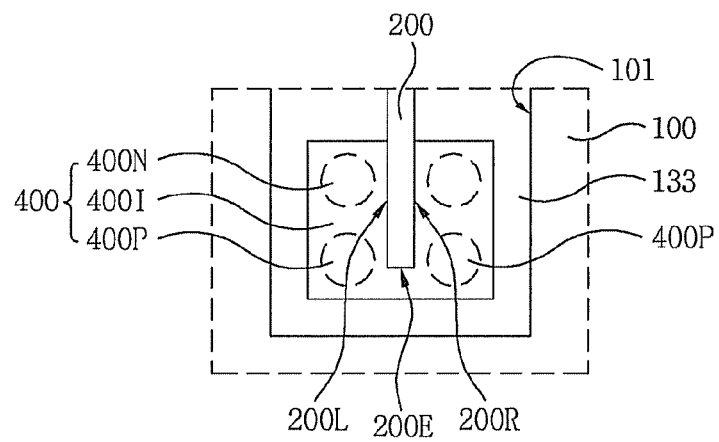

FIG. 4 is a plan view of a second region of an optical I/O device according to example embodiments.

Hereinafter, differences between the optical I/O device shown in FIG. 1 and the optical I/O device shown in FIG. 4 will be mainly described with reference to FIG. 4. Thus, a detailed description of the same, or similar, components as in the optical I/O device shown in FIG. 1 will be omitted.

Referring to FIG. 4, in an optical I/O device according to example embodiments, a photodetector 400 may be in direct contact with a left lateral surface 200L, a right lateral surface 200R, and an end surface 200E of a waveguide 200. That is, a second clad insulating layer 133 may be disposed between the photodetector 400 and a trench 101.

Figure 5:
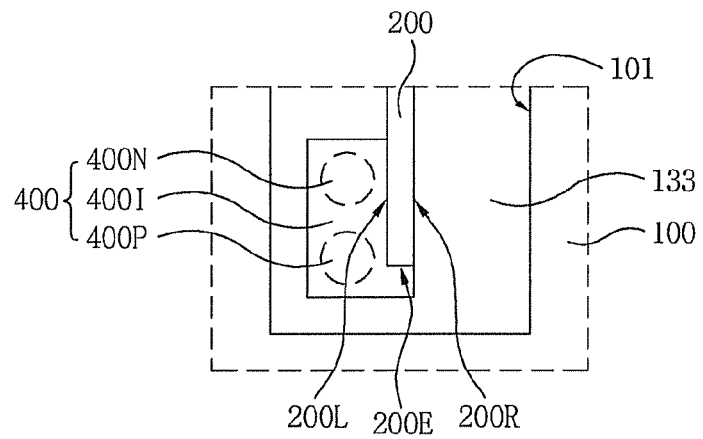

FIG. 5 is a plan view of a second region of an optical I/O device according to example embodiments.

Hereinafter, differences between the optical I/O device shown in FIG. 1 and the optical I/O device shown in FIG. 5 will be mainly described with reference to FIG. 5. Thus, a detailed description of the same, or similar, components as in the optical I/O device shown in FIG. 1 will be omitted.

Referring to FIG. 5, in an optical I/O device according to example embodiments, a photodetector 400 may be in direct contact with a left lateral surface 200L and an end surface 200E of a waveguide 200. Thus, a second clad insulating layer 133 may be disposed between the photodetector 400 and a trench 101, and between a right lateral surface 200R of the waveguide 200 and a lateral surface of the trench 101. That is, the second clad insulating layer 133 may be in contact with the right lateral surface 200R of the waveguide 200.

FIGS. 6 through 26 are cross-sectional views illustrating a method of manufacturing the optical I/O device shown in FIG. 1 according to example embodiments.

A first method of manufacturing the optical I/O device according to example embodiments will now be described with reference to FIGS. 1, 2A, and 6 through 26.

Figure 6:
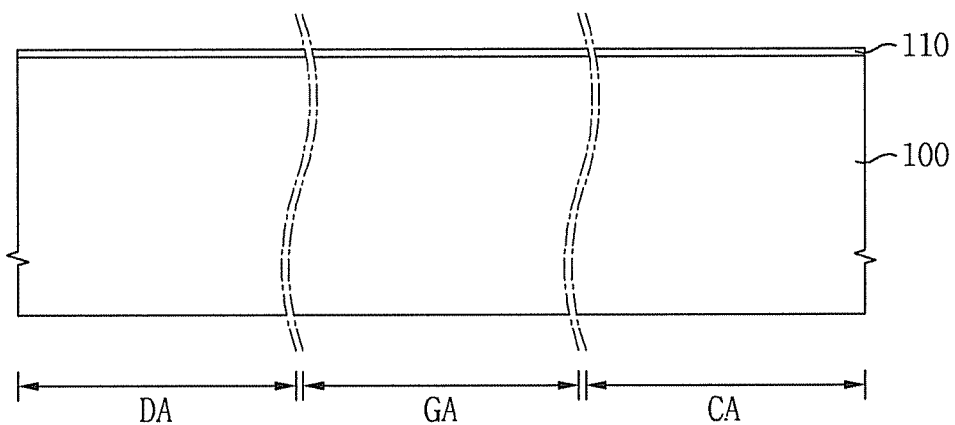

Referring to FIG. 6, the method of manufacturing the optical I/O device may include a process of preparing a substrate 100 including a first region CA, a second region DA, and a third region GA.

Thereafter, the method may include a process of forming a first insulating layer 110 on the substrate 100. The process of forming the first insulating layer 110 may include a thermal oxidation process or a chemical vapor deposition (CVD) process.

Figure 7:
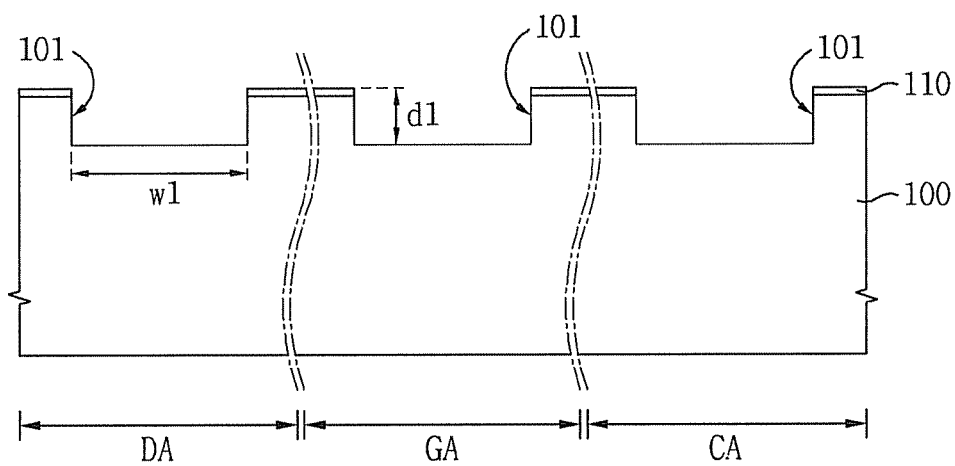

Referring to FIG. 7, the method may include a process of forming a trench 101 having a first horizontal width w1 and a first depth d1 in the substrate 100.

Figure 8:
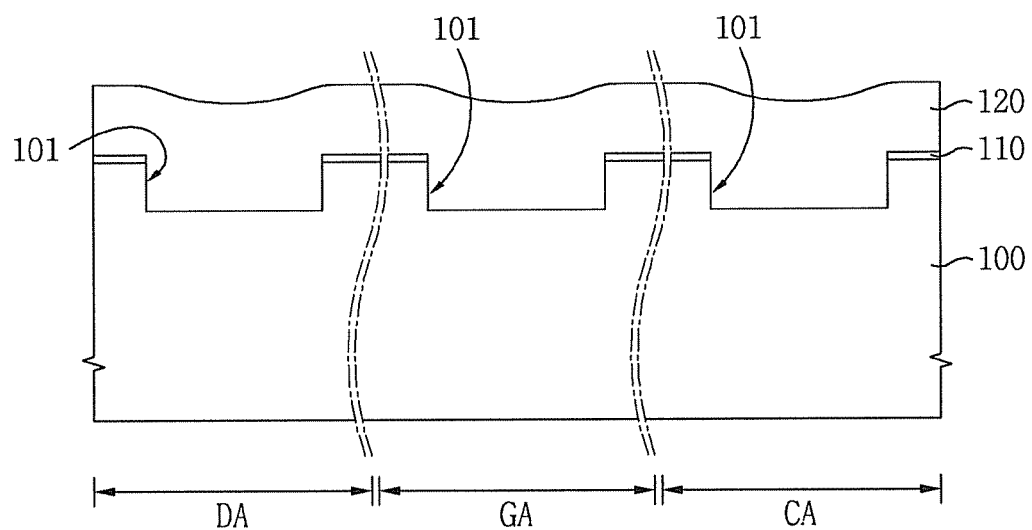

Referring to FIG. 8, the method may include a process of forming a second insulating layer 120 on the substrate 100 to fill in the trench 101.

The process of forming the second insulating layer 120 may include a CVD process. The second insulating layer 120 may be formed of a material having etching selectivity with respect to the first insulating layer 110. For example, the first insulating layer 110 may include a silicon nitride layer, and the second insulating layer 120 may include a silicon oxide layer. The second insulating layer 120 may include a material having a lower refractive index than a waveguide 200 which may be formed during a subsequent process.

Figure 9:
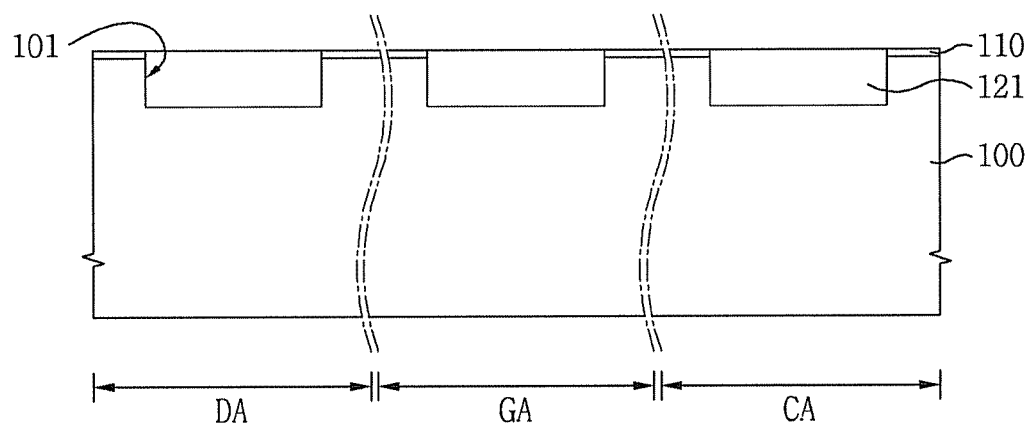

Referring to FIG. 9, the method may include a process of forming a first insulating pattern 121 to fill in the trench 101.

The process of forming the first insulating pattern 121 may include a process of planarizing the second insulating layer 120 to expose a top (or, upper) surface of the first insulating layer 110. The process of planarizing the second insulating layer 120 may include a chemical mechanical polishing (CMP) process. The first insulating layer 110 may serve as a polishing stopper (or, an etch stop layer).

Figure 10:
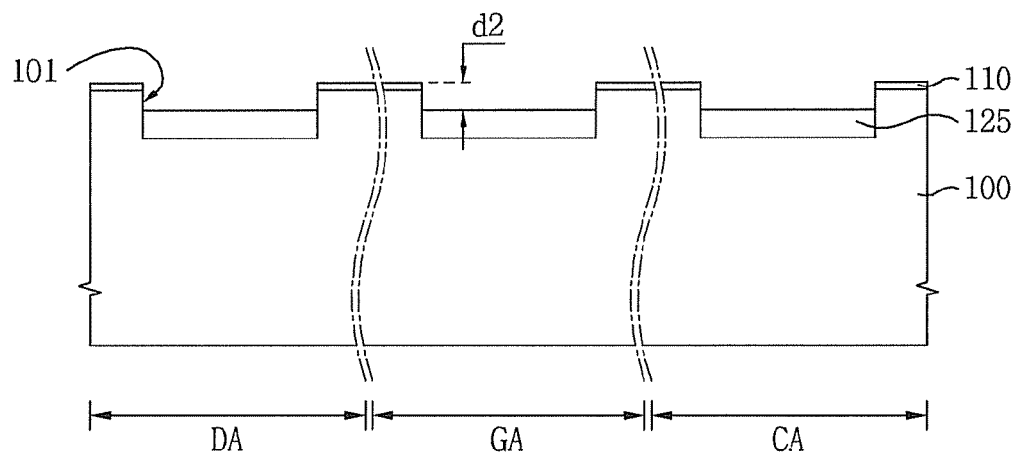

Referring to FIG. 10, the method may include a process of forming a first clad insulating layer 125 using the first insulating pattern 121.

The process of forming the first clad insulating layer 125 may include a process of recessing the first insulating pattern 121 to a second depth d2. The second depth d2 may be less than the first depth d1. Thus, the first clad insulating layer 125 may partially fill in the trench 101.

Figure 11:
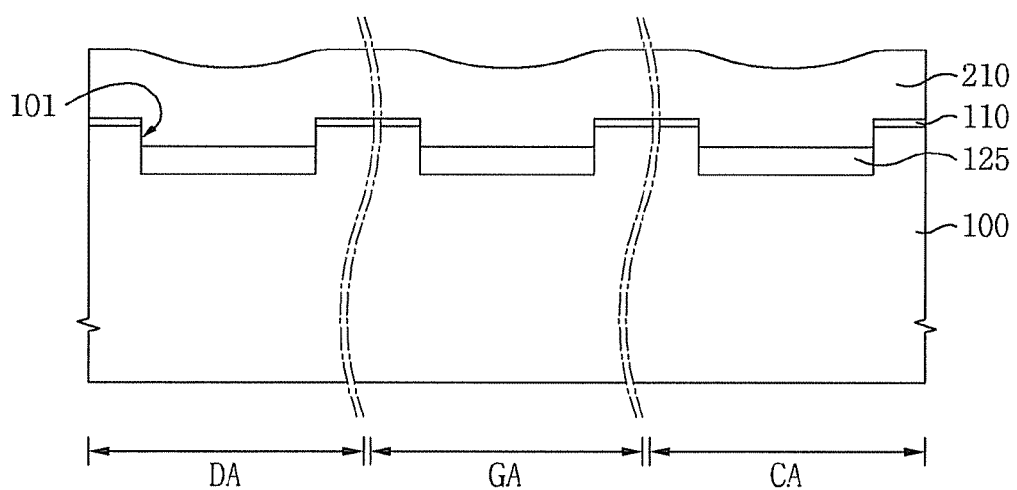

Referring to FIG. 11, the method may include a process of forming a first silicon layer 210 on the substrate 100 to fill in a remaining portion of the trench 101.

The process of forming the first silicon layer 210 may include a CVD process. The process of forming the first silicon layer 210 may include a process of depositing an amorphous silicon (a-Si) layer to fill in the trench 101. Thus, the first silicon layer 210 may include an a-Si layer.

Figure 12:
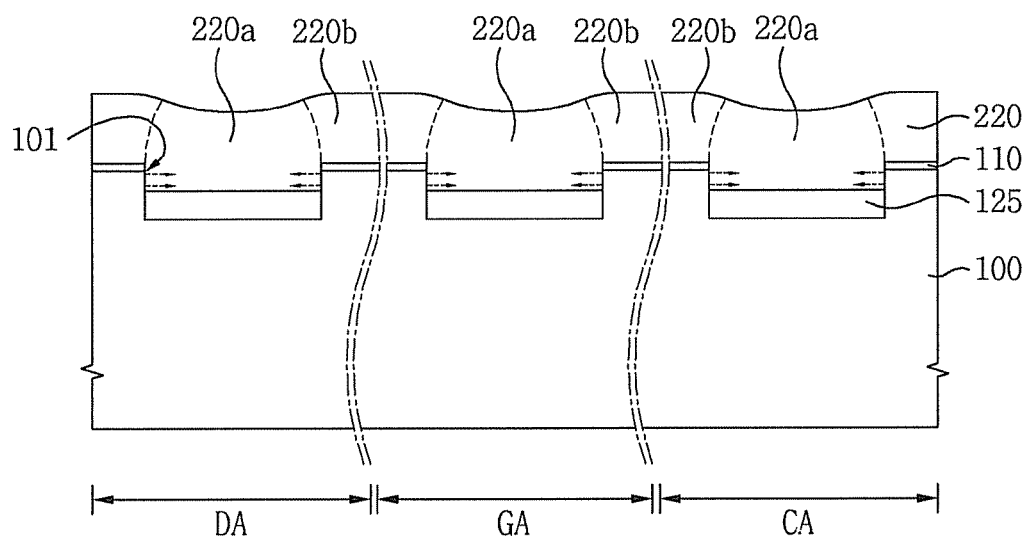

Referring to FIG. 12, the method may include a process of forming a second silicon layer 220 using the first silicon layer 210.

The process of forming the second silicon layer 220 may include a process of crystallizing the first silicon layer 210. The process of crystallizing the first silicon layer 210 may include a rapid thermal annealing (RTA) process and a laser crystallization process. The laser crystallization process may include a laser-induced lateral epitaxial growth (LEG) process. In this case, a lateral surface of the trench 101 may function as a crystallization seed. The process of forming the second silicon layer 220 may include a process of crystallizing a portion of the first silicon layer 120 using the lateral surface of the trench 101 as the crystallization seed. The first silicon layer 120 disposed on the first insulating layer 110 of the substrate 100 may be crystallized without a crystallization seed. Thus, the second silicon layer 220 may include a single crystalline silicon region 220a and a polycrystalline silicon (poly-Si) region 220b. The single crystalline silicon region 220a may be disposed in the trench 101 and be disposed on the trench 101. The poly-Si region 220b may be disposed on the first insulating layer 110.

Figure 13:
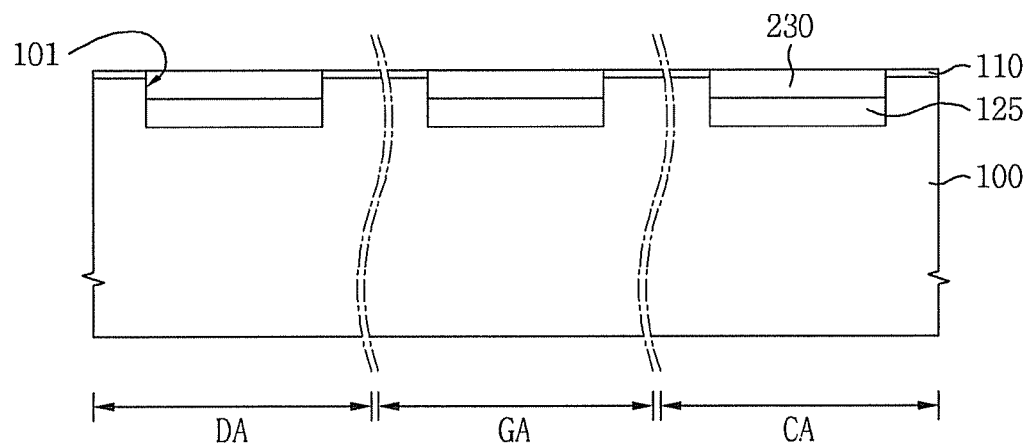

Referring to FIG. 13, the method may include a process of forming a first silicon pattern 230 to fill in the trench 101.

The process of forming the first silicon pattern 230 may include a process of planarizing the second silicon layer 220. The process of planarizing the second silicon layer 220 may include a CMP process. Thus, the first silicon pattern 230 may include single crystalline silicon. Also, the first silicon pattern 230 may have a thickness equal to the second depth d2.

Figure 14:
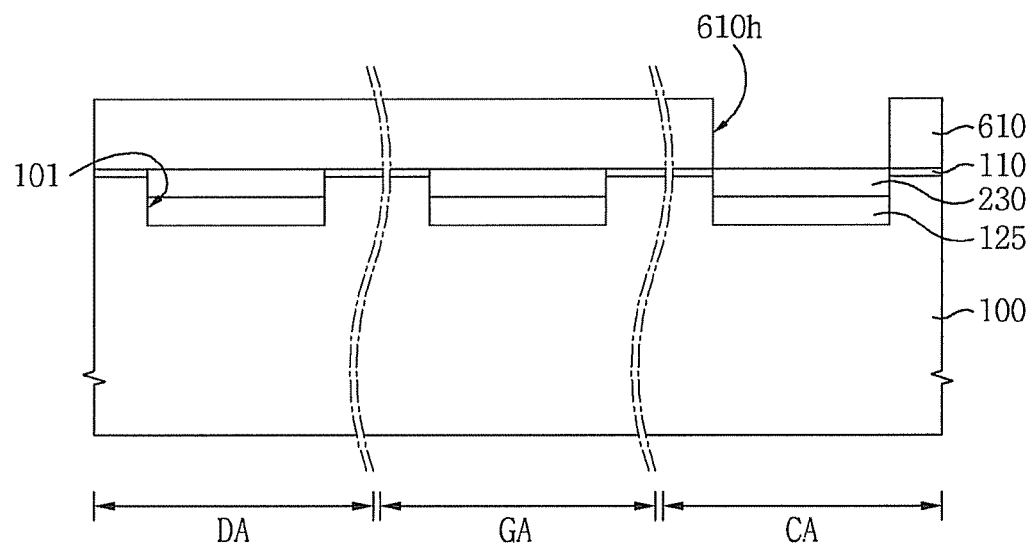

Referring to FIG. 14, the method may include a process of forming a first photoresist (PR) pattern 610 having a first hole 610h on the substrate 100. The first hole 610h may expose a top surface of the first silicon pattern 230 of the first region CA.

Figure 15:
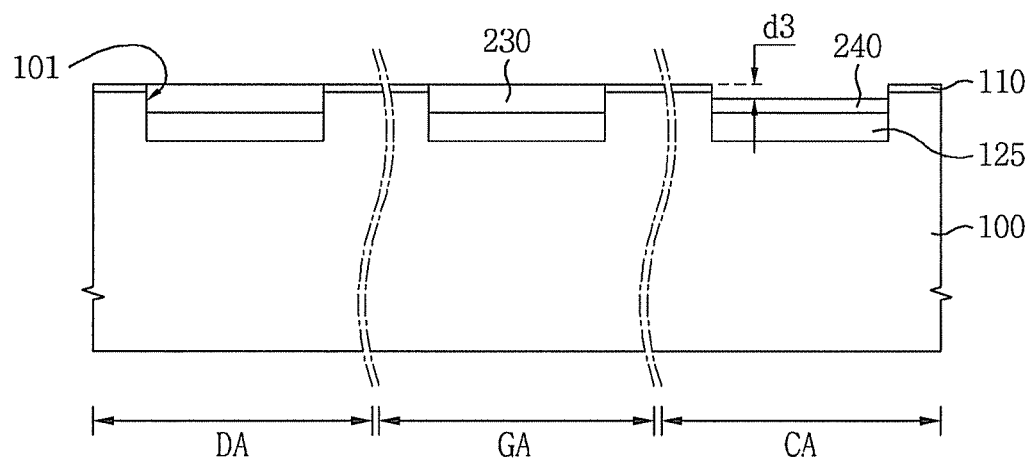

Referring to FIG. 15, the method may include a process of forming a second silicon pattern 240 in the first region CA using the first silicon pattern 230.

The process of forming the second silicon pattern 240 may include a process of etching the first silicon pattern 230 of the first region CA to a third depth d3 using the first PR pattern 610. The first PR pattern 610 may be removed after the etching of the first silicon pattern 230 is completed. The process of etching of the first silicon pattern 230 may include a dry etching process and a wet etching process. Thus, the second silicon pattern 240 may partially fill in the trench 101 of the first region CA. The second silicon pattern 240 may define a grating of a coupler 300 which will be formed during a subsequent process.

Figure 16:
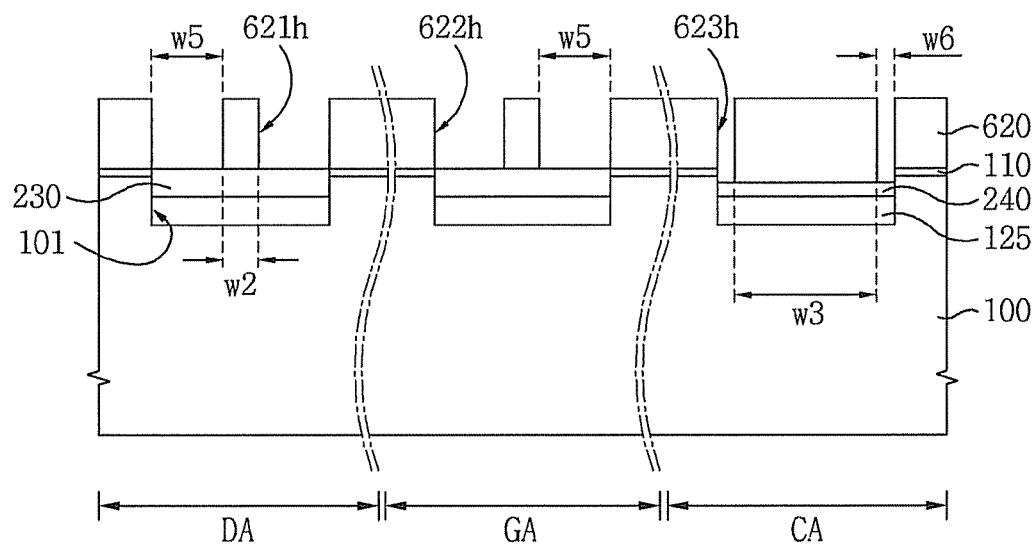

Referring to FIG. 16, the method may include a process of forming a second PR pattern 620 having a second hole 621h, a third hole 622h, and a fourth hole 623h on the substrate 100.

Each of the second and third holes 621h and 622h may have a fifth horizontal width w5. The fourth hole 623h may have a sixth horizontal width w6. Each of the fifth horizontal width w5 and the sixth horizontal width w6 may be less than half of the first horizontal width w1 of the trench 101.

Each of the second PR pattern 620 of the second region DA and the second PR pattern 620 of the third region GA may have a second horizontal width w2. The second PR pattern 620 of the first region CA may have a third horizontal width w3.

Figure 17:
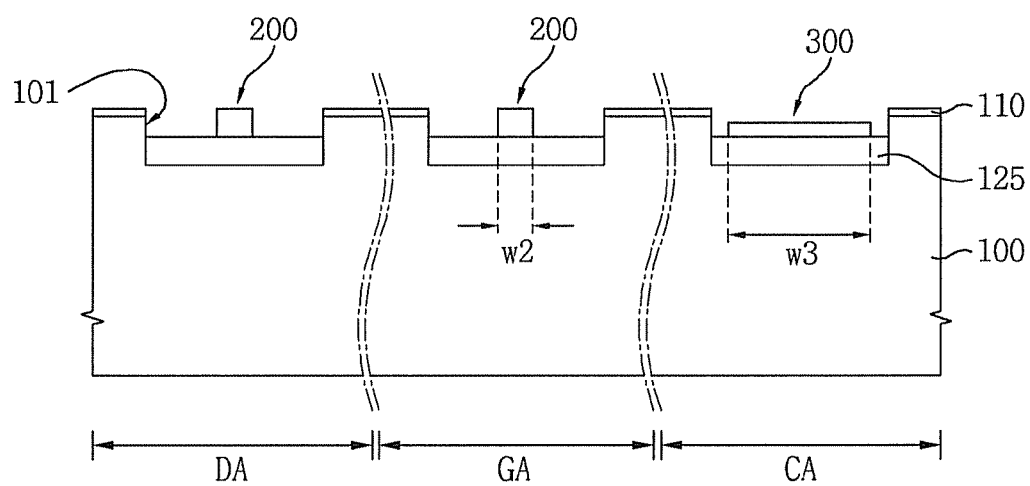

Referring to FIG. 17, the method may include a process of forming a waveguide 200 and a coupler 300 within the trench 101.

The process of forming the waveguide 200 and the coupler 300 may include a process of patterning the first silicon pattern 230 and the second silicon pattern 240 using the second PR pattern 620. The second PR pattern 620 may be removed after the formation of the waveguide 200 and the coupler 300 is completed. Thus, the waveguide 200 may have the second horizontal width w2. The coupler 300 may have the third horizontal width w3. Also, the waveguide 200 may have a thickness equal to the second depth d2.

Figure 18:
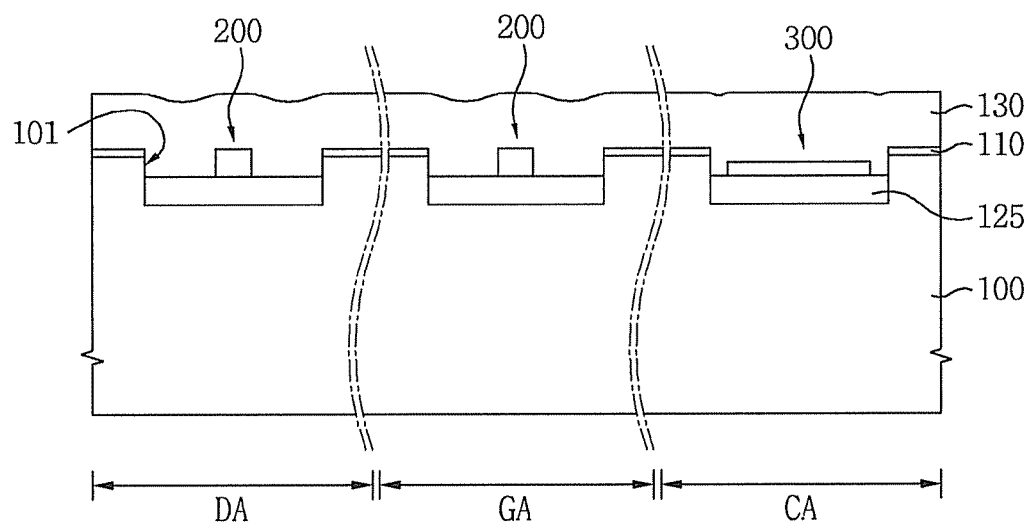

Referring to FIG. 18, the method may include a process of forming a third insulating layer 130 on the substrate 100 to cover the waveguide 200 and the coupler 300. The process of forming the third insulating layer 130 may include a CVD process.

Figure 19:
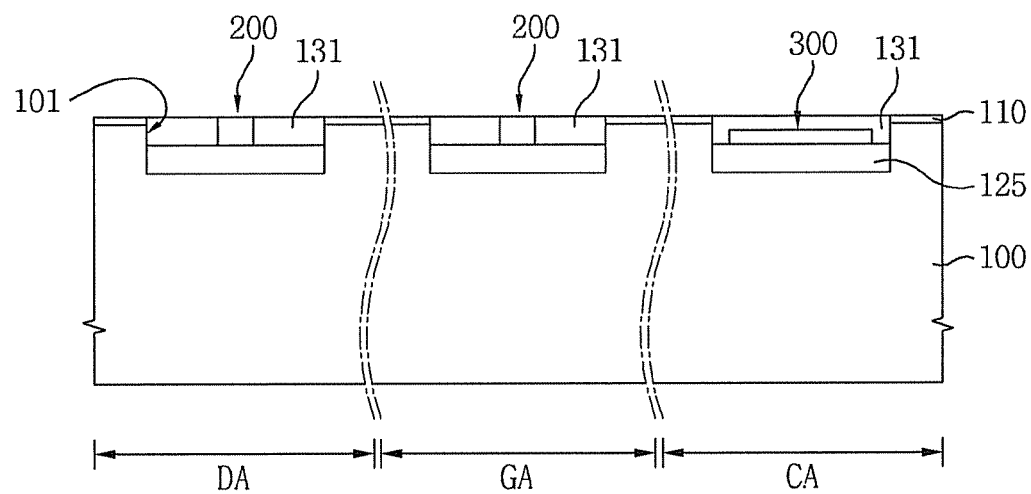

Referring to FIG. 19, the method may include a process of forming a second insulating pattern 131 on the substrate 100 to fill in the trench 101.

The process of forming the second insulating pattern 131 may include a process of planarizing the third insulating layer 130 to expose the top surface of the first insulating layer 110. The process of planarizing the third insulating layer 130 may include a CMP process. The second insulating pattern 131 may surround lateral surfaces of the waveguide 200 and the coupler 300. The second insulating pattern 131 may partially cover a top (or, upper) surface of the coupler 300.

Figure 20:
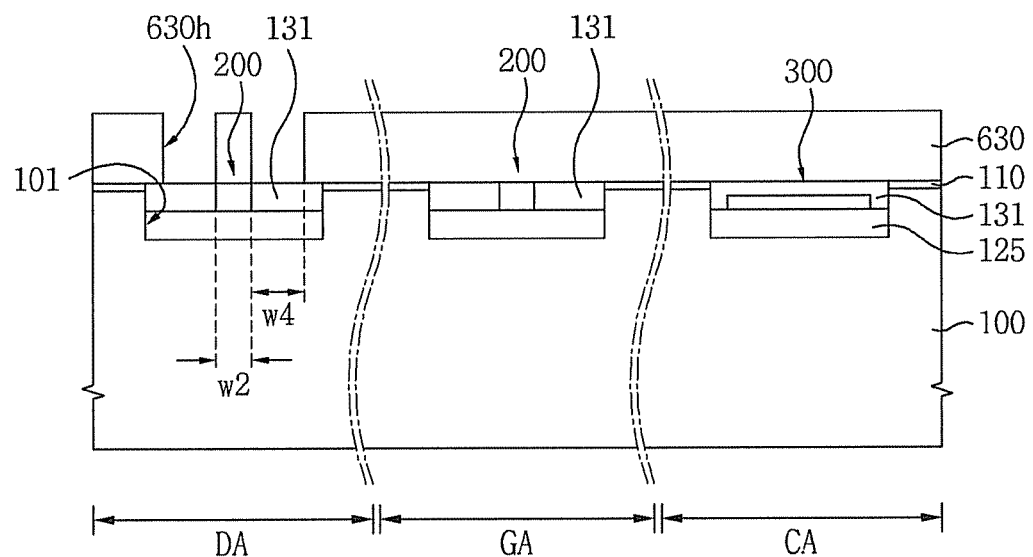

Referring to FIG. 20, the method may include a process of forming a third PR pattern 630 having a fifth hole 630h on the substrate 100.

The fifth hole 630h may be disposed adjacent to the waveguide 200 of the second region DA. The fifth hole 630h may have a fourth horizontal width w4. The sum of twice the fourth horizontal width w4 and the second horizontal width w2 may be less than the first horizontal width w1.

Figure 21:
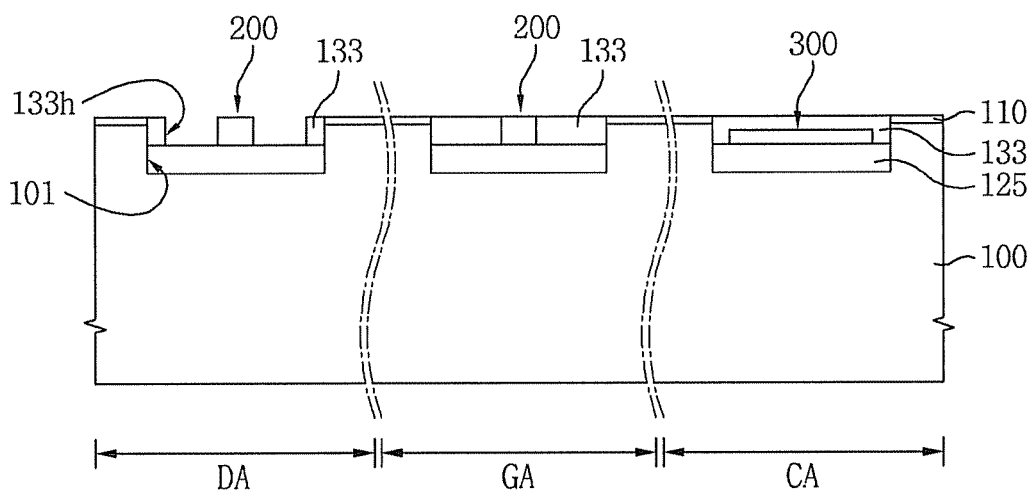

Referring to FIG. 21, the method may include a process of forming a second clad insulating layer 133 having a groove 133h within the trench 101 using the third PR pattern 630.

The process of forming the second clad insulating layer 133 may include a process of patterning the second insulating pattern 131 of the second region DA using the third PR pattern 630. The process of patterning the second insulating pattern 131 may include a dry etching process and/or a wet etching process. The third PR pattern 630 may be removed after the process of forming the second clad insulating layer 133 is completed. The groove 133h may partially expose a top surface of the first clad insulating layer 125 of the second region DA.

Figure 22:
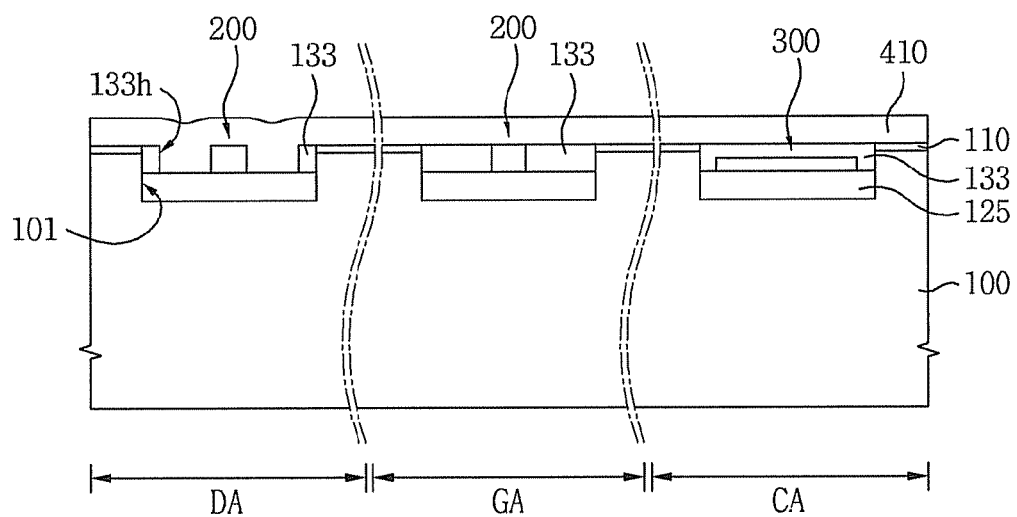

Referring to FIG. 22, the method may include a process of forming a first photoelectric conversion layer 410 on the substrate 100 to fill in the groove 133h.

The process of forming the first photoelectric conversion layer 410 may include a CVD process. The first photoelectric conversion layer 410 may include germanium (Ge). The first photoelectric conversion layer 410 may cover the lateral surface and top surface of the waveguide 200 of the second region DA.

Figure 23:
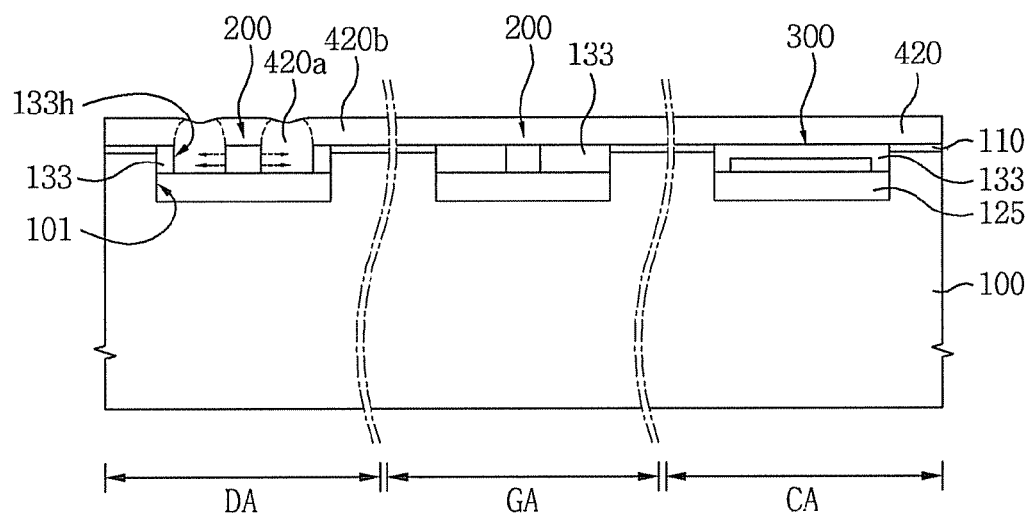

Referring to FIG. 23, the method may include a process of forming a second photoelectric conversion layer 420 using the first photoelectric conversion layer 410.

The process of forming the second photoelectric conversion layer 420 may include a process of crystallizing the first photoelectric conversion layer 410. The process of crystallizing the first photoelectric conversion layer 410 may include a process of fusing the first photoelectric conversion layer 410. In this case, the lateral surface of the waveguide 200 of the second region DA may serve as a crystallization seed.

That is, the process of forming the second photoelectric conversion layer 420 may include a process of crystallizing the first photoelectric conversion layer 410 using the lateral surface of the waveguide 200. The first photoelectric conversion layer 410 disposed on the first insulating layer 110 of the substrate 100 may be crystallized without a crystallization seed. Thus, the second photoelectric conversion layer 420 may include a single crystalline Ge region 420a and a poly Ge region 420b. The single crystalline Ge region 420a may be disposed in and/or on the trench 101. The poly Ge region 420b may be disposed on the first insulating layer 110.

Here, the process of forming the second photoelectric conversion layer 420 may include a process of facilitating the crystallization of the first photoelectric conversion layer 410. For example, the process of forming the second photoelectric conversion layer 420 may include an RTA process and a laser crystallization process. The laser crystallization process may include an LEG process. Thus, the second photoelectric conversion layer 420 may reduce the generation of crystal defects at an interface between the second photoelectric conversion layer 420 and the waveguide 200.

Figure 24:
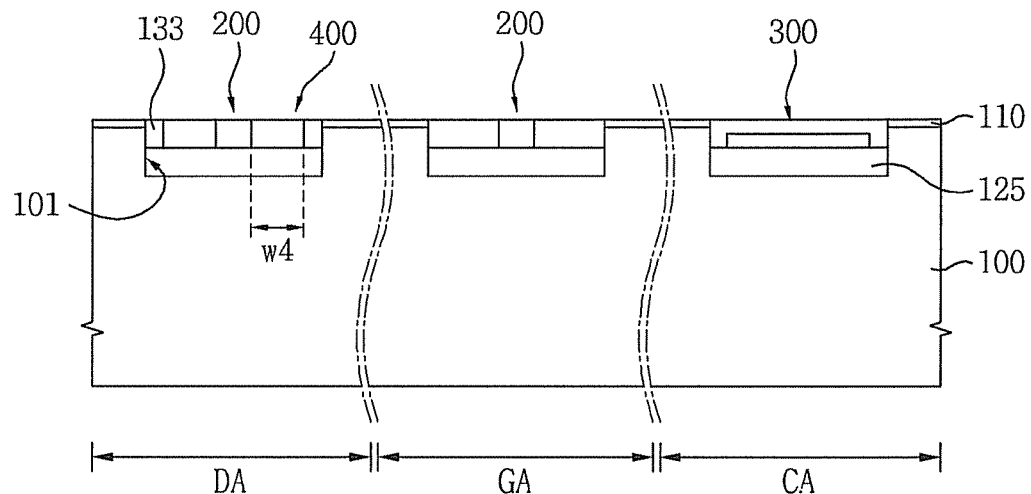

Referring to FIG. 24, the method may include a process of forming a photodetector 400 to fill in the groove 133h.

The process of forming the photodetector 400 may include a process of planarizing the second photoelectric conversion layer 420 to expose the top surface of the first insulating layer 110. The process of planarizing the second photoelectric conversion layer 420 may include a CMP process. Thus, a top surface of the photodetector 420 may be at the same level as a top surface of the waveguide 200. Also, the top surface of the photodetector 420 may be at the same level as the top surface of the coupler 300.

The photodetector 400 may include single crystalline Ge grown from the lateral surface of the waveguide 200 of the second region DA. The photodetector 400 may be in direct contact with both lateral surfaces of the waveguide 200 of the second region DA.

In addition, the photodetector 400 may have a thickness equal to the second depth d2 of the groove 133h. That is, the photodetector 400 may have the same thickness as the waveguide 200. The photodetector 400 may have the same fourth horizontal width w4 as the groove 133h.

Figure 25:
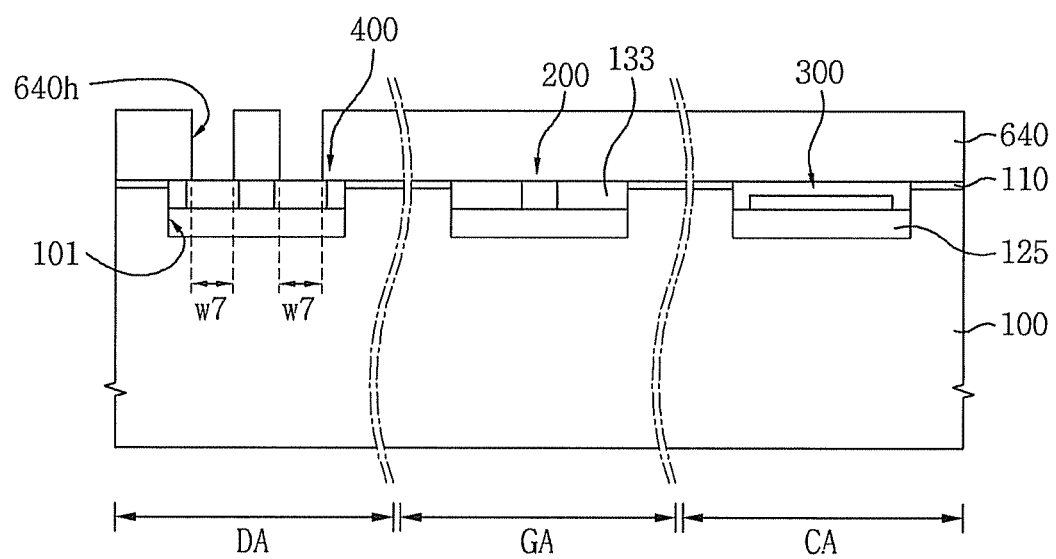

Referring to FIG. 25, the method may include a process of forming a fourth PR pattern 640 having a sixth hole 640h on the substrate 100.

The sixth hole 640h may be disposed on the second region DA. The sixth hole 640h may have a seventh horizontal width w7 less than the fourth horizontal width w4. Thus, the sixth hole 640h may partially expose the top surface of the photodetector 400 of the second region DA.

Figure 26:
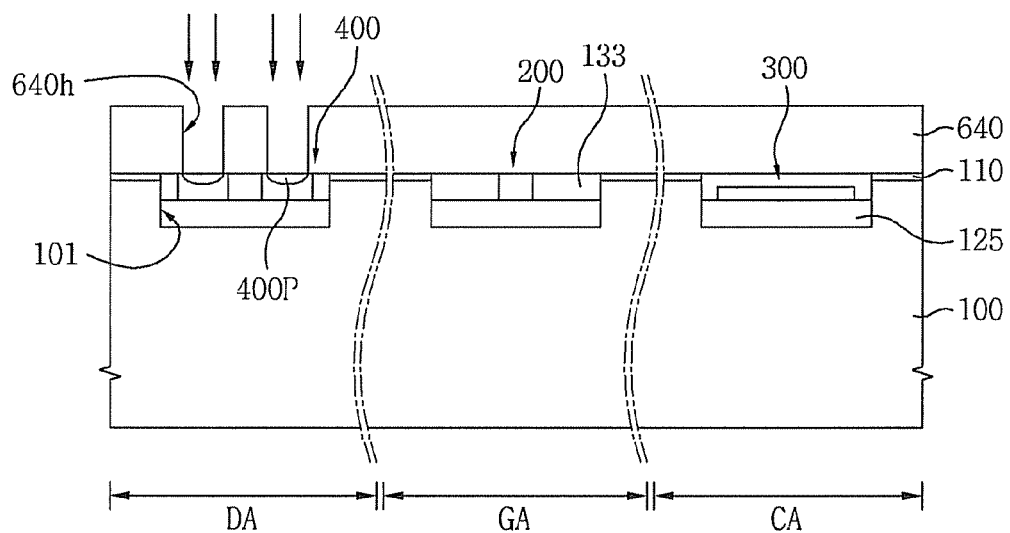

Referring to FIG. 26, the method may include a process of forming a first doping region 400P in the photodetector 400.

The process of forming the first doping region 400P may include a process of doping first impurities using the fourth PR pattern 640. The fourth PR pattern 640 may be removed after the process of forming the first doping region 400P is completed. The first impurities may be N-type impurities or P-type impurities. The process of forming the first doping region 400P may include an ion implantation process.

Thereafter, as illustrated in FIGS. 1 and 2B, the method may include a process of forming a second doping region 400N apart from the first doping region 400P.

The process of forming the second doping region 400N may include a process of doping second impurities of a different conductivity type from the first impurities into the photodetector 400. For example, the first impurities may be P-type impurities, and the second impurities may be N-type impurities. In this case, an undoped intrinsic region 400I may be formed between the first and second doping regions 400P and 400N.

FIGS. 27 through 30 are cross-sectional views illustrating a method of manufacturing the optical I/O device according to example embodiments.

Hereinafter, differences between the method of manufacturing the optical I/O device shown in FIGS. 6 through 26 and the method of manufacturing the optical I/O device shown in FIGS. 27 through 30 will be mainly described with reference to FIGS. 27 through 30.

Figure 27:
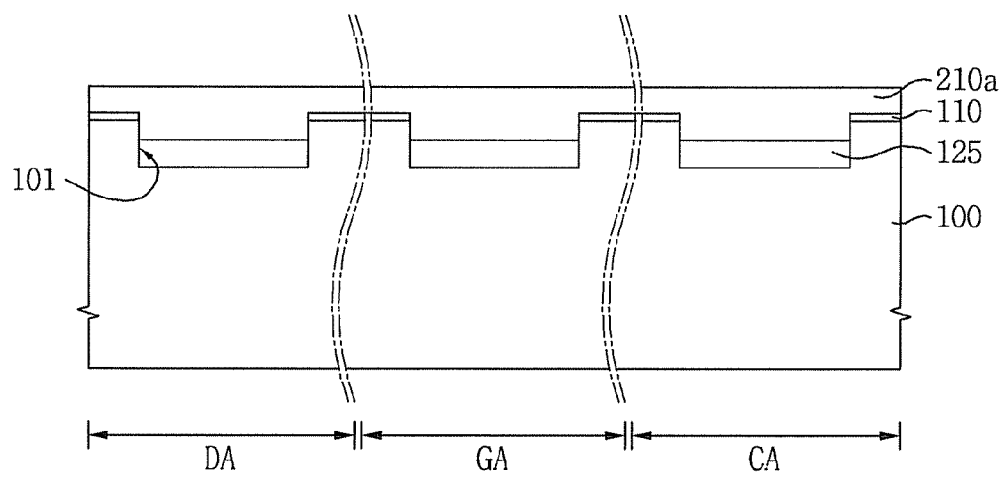

Referring to FIG. 27, the method of manufacturing the optical I/O device according to example embodiments may include a process of forming a trench 101 in a substrate 100 including a first region CA, a second region DA, and a third region GA.

The method may include a process of forming a first clad insulating layer 125 to partially fill in the trench 101.

Next, the second method may include forming a third silicon layer 210a having a planar top surface on the substrate 100.

The process of forming the third silicon layer 210a may include a process of planarizing a top surface of the first silicon layer 210. The process of planarizing the top surface of the first silicon layer 210 may include a partial CMP process. The planar top surface of the third silicon layer 210a may prevent dispersion of laser beams irradiated during a subsequent laser crystallization process.

Figure 28:
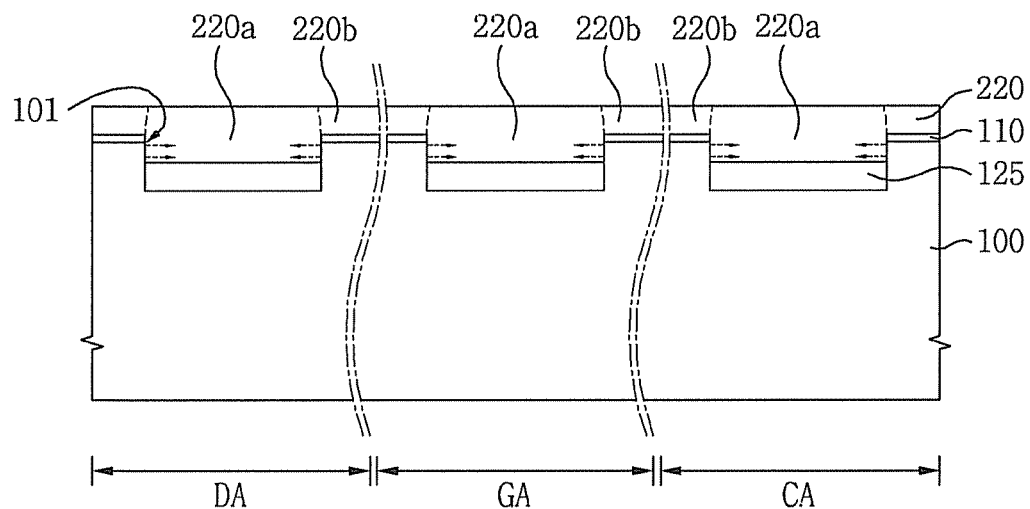

Referring to FIG. 28, the method may include a process of forming a second silicon layer 220 using the third silicon layer 210a.

The process of forming the second silicon layer 220 may include a process of crystallizing the third silicon layer 210a. The process of crystallizing the third silicon layer 210a may include a process of fusing the third silicon layer 210a. The process of forming the second silicon layer 220 may include a laser crystallization process. The laser crystallization process may include an LEG process.

The second silicon layer 220 may include a single crystalline silicon region 220a and a poly-Si region 220b. The single crystalline silicon region 220a may be disposed in and/or on the trench 101. The poly-Si region 220b may be disposed on the first insulating layer 110.

Figure 29:
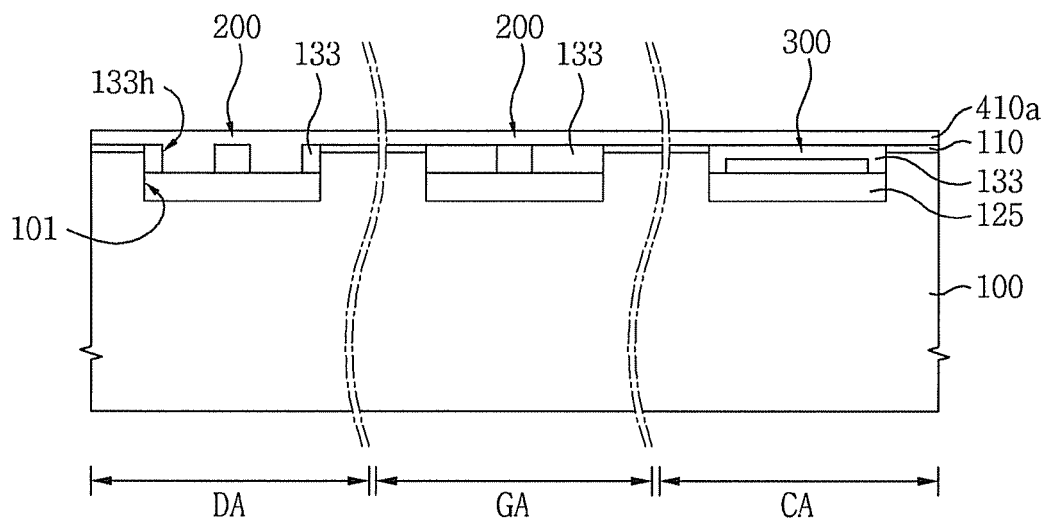

Referring to FIG. 29, the method may include a process of forming a waveguide 200 and a coupler 300 within the trench 101 using the second silicon layer 220.

Afterwards, the method may include a process of forming a second clad insulating layer 133 having a groove 133h within the trench 101.

Thereafter, the method may include a process of forming a first photoelectric conversion layer (410 shown in FIG. 22) to fill in the groove 133h of the second clad insulating layer 133.

Next, the method may include a process of forming a third photoelectric conversion layer 410a to fill the groove 133h.

The process of forming the third photoelectric conversion layer 410a may include a process of planarizing a top surface of the first photoelectric conversion layer. The process of planarizing the top surface of the first photoelectric conversion layer may include a partial CMP process. The planarized top surface of the third photoelectric conversion layer 410a may prevent dispersion of laser beams irradiated during a subsequent laser crystallization process.

Figure 30:
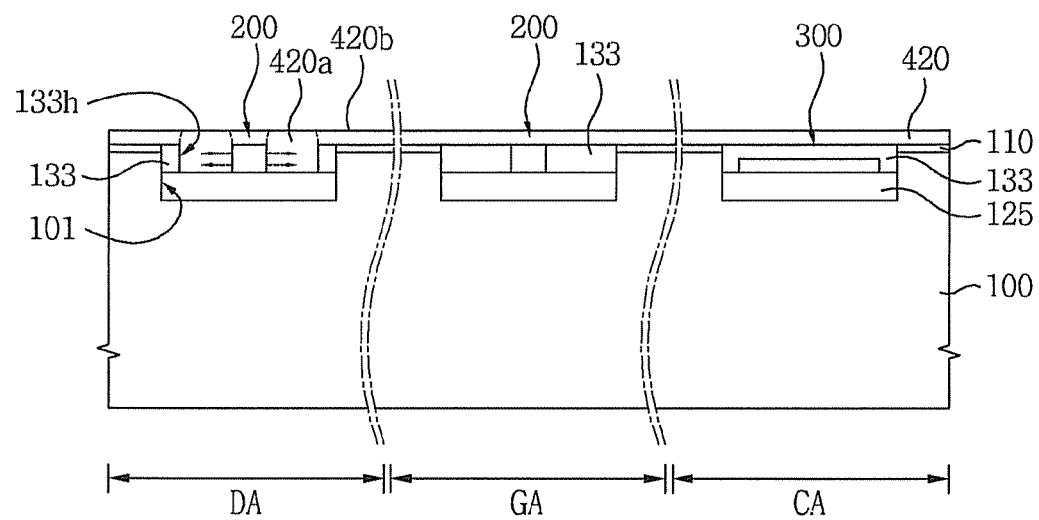

Referring to FIG. 30, the method may include a process of forming a second photoelectric conversion layer 420 by crystallizing the third photoelectric conversion layer 410a.

The second photoelectric conversion layer 420 may include a single crystalline Ge region 420a and a poly Ge region 420b. The single crystalline Ge region 420a may be disposed in and/or on the groove 133h. The poly Ge region 420b may be disposed on the first insulating layer 110.

The process of forming the second photoelectric conversion layer 420 may include a laser crystallization process. The laser crystallization process may include an LEG process.

Figure 31:
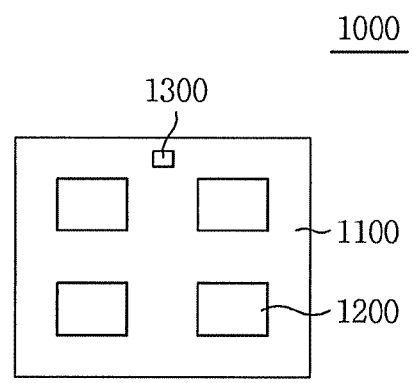

FIG. 31 is a construction diagram of a memory device including an optical I/O device according to example embodiments.

Referring to FIG. 31, a memory device 1000 including an optical I/O device according to example embodiments may include a memory substrate 1100, a plurality of memory cells 1200, and an I/O circuit 1300. The memory substrate 1100 may be a bulk silicon wafer.

The plurality of memory cells 1200 may include cells of a dynamic random access memory (DRAM), a static random access memory (SRAM), a flash memory, a phase-change random access memory (PRAM), a magnetic random access memory (MRAM), or a resistive random access memory (RRAM).

The I/O circuit 1300 may include an optical I/O device according to example embodiments. For example, the I/O circuit 1300 may include an optical I/O device including a waveguide, a coupler, and a photodetector buried in the memory substrate 1100. The memory device 1000 may optically transmit/receive data to/from an adjacent electronic device or other memory devices using the I/O circuit 1300 including the optical I/O device according to example embodiments. Thus, the memory device 1000 may transmit and receive data more stably and rapidly.

Figure 32:
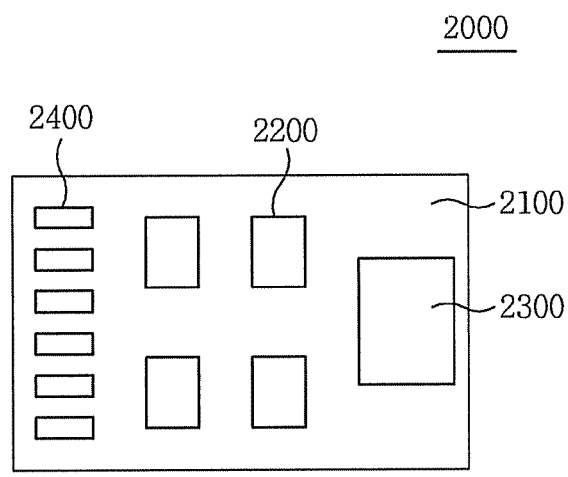

FIG. 32 is a construction diagram of a semiconductor module including an optical I/O device according to example embodiments.

Referring to FIG. 32, a semiconductor module 2000 including an optical I/O device according to example embodiments may include a module substrate 2100, a plurality of semiconductor devices 2200, a control device 2300, and a plurality of I/O units 2400. The plurality of semiconductor devices 2200, the control device 2300, and the I/O units 2400 may be electrically or optically connected to one another.

Each of the plurality of semiconductor devices 2200 may include a memory device. For example, each of the semiconductor devices 2200 may include a DRAM, a SRAM, a flash memory, a PRAM, an MRAM, or an RRAM. The semiconductor module 2000 may not include the control device 2300. The semiconductor module 2000 including the optical I/O device according to example embodiments may include a memory module. For example, the semiconductor module 2000 may include a memory card.

Each of the plurality of semiconductor devices 2200, the control device 2300, and/or the plurality of I/O units 2400 may include an optical I/O device according to example embodiments. For example, each of the plurality of semiconductor devices 2200, the control device 2300, and/or the plurality of I/O units 2400 may include an optical I/O device including a waveguide, a coupler, and a photodetector. The semiconductor module 2000 may optically transmit/receive data to/from an internal or external electronic device using an optical I/O device according to example embodiments. Thus, the semiconductor module 2000 may more stably and rapidly transmit and receive data.

In addition, as described and illustrated in FIG. 32, each of the plurality of semiconductor devices 2200 may include a memory device. That is, each of the plurality of semiconductor devices 2200 may include an optical I/O device according to example embodiments. Thus, the plurality of semiconductor devices 2200 may be optically connected to one another.

Figure 33:
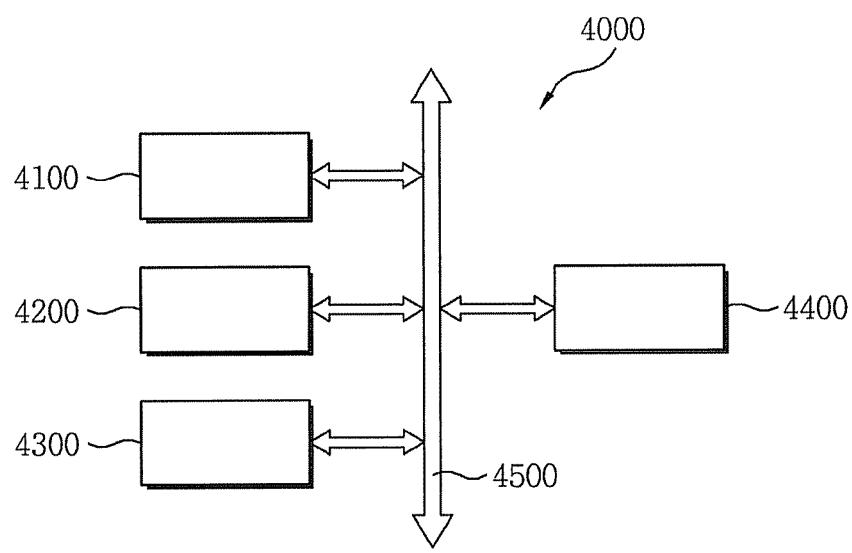

FIG. 33 is a construction diagram of an electronic device including an optical I/O device according to example embodiments.

Referring to FIG. 33, an electronic device 4000 including an optical I/O device according to example embodiments may include an interface 4100, a controller 4200, a storage device 4300, and an external I/O device 4400. The interface 4100 may be electrically connected to the controller 4200, the storage device 4300, and the external I/O device 4400 through a bus 4500.

The electronic device 4000 may include a personal digital assistant (PDA), a portable computer, a web tablet, a wireless phone, a mobile phone, and a digital music player.

The interface 4100 may communicate data with an external system. Specifically, the interface 4100 may transmit/receive data to/from a communication network. The interface 4100 may include an optical I/O device according to example embodiments. The interface 4100 may communicate data with the external system using an optical signal. Thus, the interface 4100 may have higher reliability than in the conventional device.

The controller 4200 may include a microprocessor (MP), a digital processor (DP), a microcontroller (MC), and other processors similar thereto. The external I/O device 4400 may be a keypad, a keyboard, or a display device.

The storage device 4300 may be used to store commands executed by the controller 4200. The interface 4100, the controller 4200, the storage device 4300, and the I/O device 4400 may be electrically or optically connected to one another. Each of the interface 4100, the controller 4200, the storage device 4300, and the I/O device 4400 may include an optical I/O device according to example embodiments. For example, the storage device 4300 may include an optical I/O device including a waveguide, a coupler, and a photodetector buried in a memory substrate (not shown). Thus, data communication between the storage device 4300 and the interface 4100 may be more reliable than in the conventional case.

A photodetector of an optical I/O device according to example embodiments is in contact with a lateral surface of a waveguide, and a top surface of the photodetector is at the same level as a top surface of the waveguide. That is, the photodetector, the waveguide, and the coupler are buried in a trench of the substrate. Thus, in the optical I/O device according to example embodiments, the photodetector may be prevented from being damaged due to a subsequent process of manufacturing an electronic device.

In an optical I/O device according to example embodiments, a waveguide, a coupler, and a photodetector may be disposed within a trench formed in a substrate. That is, the waveguide, the coupler, and the photodetector of the optical I/O device according to example embodiments may be buried within the substrate. Thus, the optical I/O device according to example embodiments may prevent the waveguide, the coupler, and the photodetector from being damaged due to a manufacturing process of an electronic device (e.g., a memory cell) formed in the remaining region of the substrate. Therefore, the optical I/O device according to example embodiments has improved reliability.

The foregoing is illustrative of example embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of the example embodiments as defined in the claims.

What is claimed is:

1. An optical input/output (I/O) device, comprising:
 a substrate including a trench, the trench having a constant width in a first direction and extending in a second direction vertical to the first direction;
 a waveguide within the trench of the substrate; and
 a photodetector within the trench and optically connected to the waveguide,
 wherein an upper surface of the photodetector is at a same level as an upper surface of the waveguide.

2. The optical I/O device of claim 1, wherein,
 the waveguide has the upper surface, a first lateral surface, a second lateral surface, and an end surface, and
 the photodetector is in direct contact with the first lateral surface of the waveguide.

3. The optical I/O device of claim 2, wherein the photodetector is in direct contact with the second lateral surface of the waveguide.

4. The optical I/O device of claim 1, wherein a horizontal width of the photodetector is greater than a horizontal width of the waveguide.

5. The optical I/O device of claim 1, wherein a horizontal width of the trench is greater than the sum of a horizontal width of the photodetector and a horizontal width of the waveguide.

6. The optical I/O device of claim 1, wherein the photodetector has a thickness equal to that of the waveguide.

7. The optical I/O device of claim 1, wherein the waveguide includes silicon (Si), and the photodetector includes germanium (Ge).

8. The optical I/O device of claim 1, further comprising:
a first clad insulating layer between a lower surface of the trench and a lower surface of the photodetector; and
a second clad insulating layer between a lateral surface of the trench and a lateral surface of the photodetector.

9. The optical I/O device of claim 8, wherein the second clad insulating layer and the first clad insulating layer include identical materials.

10. An optical input/output (I/O) device, comprising:
a substrate including a trench having first side and second side, the trench having a first sidewall being straight line, the first sidewall extending through the first side and the second side, and a second sidewall being parallel with the first sidewall;
a coupler at the first side of the trench of the substrate;
a photodetector at the second side of the trench of the substrate; and
a waveguide configured to provide an optical connection between the coupler and the photodetector,
wherein the coupler, the photodetector, and the waveguide are within the trench.

11. The optical I/O device of claim 10, wherein the photodetector is in direct contact with a first lateral surface of an end portion of the waveguide.

12. The optical I/O device of claim 11, wherein the photodetector is in direct contact with an end surface of the end portion of the waveguide.

13. The optical I/O device of claim 10, wherein the photodetector surrounds an end portion of the waveguide.

14. The optical I/O device of claim 10, wherein an upper surface of the photodetector, an upper surface of the coupler and an upper surface of the waveguide are at a same level.

15. The optical I/O device of claim 10, wherein,
the photodetector includes a first doping region, a second doping region, and an intrinsic region,
the intrinsic region is between the first and second doping regions, and
the second doping region includes impurities of a different conductivity type than the first doping region.

16. An optical I/O device, comprising:
A substrate including a trench having a first region and a second region;
a waveguide within the first region and the second region of the trench;
a first photodetector within the first region of the trench, and optically connected to a first sidewall of the waveguide,
wherein a width of the first region of the trench is the same as a width of the second region of the trench, and
wherein the first photodetector has a height equal to that of the waveguide.

17. The optical I/O device of claim 16, wherein an upper surface of the first photodetector and an upper surface of the waveguide are at a same level as an upper surface of the substrate.

18. The optical I/O device of claim 16, further comprising:
a second photodetector optically connected to a second sidewall of the waveguide, the second photodetector having a height equal to that of the first photodetector.

19. The optical I/O device of claim 17, wherein the first photodetector is in direct contact with the first sidewall of the waveguide and the second photodetector is in direct contact with the second sidewall of the waveguide.

20. The optical I/O device of claim 16, wherein the first photodetector includes a first doping region and a second doping region respectively along the first sidewalls of the waveguide.

* * * * *